United States Patent [19]
Livermore et al.

[11] 3,731,658
[45] May 8, 1973

[54] DISPOSABLE PET AND ANIMAL DISH

[76] Inventors: Keith Livermore; Donna Livermore, both of P.O. Box 575, Moscow, Idaho 83843

[22] Filed: Aug. 17, 1971

[21] Appl. No.: 172,437

[52] U.S. Cl. ............................ 119/61, 229/3.5 MF
[51] Int. Cl. ................................................ A01k 5/00
[58] Field of Search .................. 119/51, 61; 229/2.5, 229/3.5 MF

[56] References Cited

UNITED STATES PATENTS

| | | | |
|---|---|---|---|
| 3,195,510 | 7/1965 | Bernstein | 119/61 |
| 2,191,811 | 2/1940 | Trampier, Sr. | 119/51 |
| 2,584,301 | 2/1952 | Sinclair | 119/61 |
| 2,677,350 | 5/1954 | Prestidge et al. | 119/61 |
| 2,738,915 | 3/1956 | St. Clair | 229/2.5 |
| 2,813,509 | 11/1957 | Bruno | 119/61 |
| 2,928,372 | 3/1960 | Farley | 119/61 |
| 3,622,036 | 11/1971 | Bongaerts | 119/61 |
| 3,653,362 | 4/1972 | Davis | 119/61 |

*Primary Examiner*—Aldrich F. Medbery

[57] ABSTRACT

A dish for containing foods served to household pets or other animals, the dish being made of inexpensive material so that after a single use it can be discarded so to eliminate the need to wash dishes of pets, and the dish being designed so that it will not tip as well as having other advantageous features.

1 Claim, 2 Drawing Figures

PATENTED MAY 8 1973

3,731,658

INVENTORS
KEITH LIVERMORE
DONNA LIVERMORE

DISPOSABLE PET AND ANIMAL DISH

This invention relates generally to pet supplies. More specifically it relates to feeding dishes for animals. It is generally well known that most persons find it a disagreeable task to wash up a feeding dish of a household pet or other animal. The food for such animals is inferior to that for human beings, and persons resent to touch the same in cleaning out left-overs in a dish. Additionally, persons usually object to wash the dishes of animals in a kitchen sink where their own dishes are placed, so that they are obliged to clean them in a washroom or out-of-doors if available. Such chores being objectionable, the persons thus tend to neglect cleaning up the animal dish promptly so that flies are attracted to the premises, and the stuck-on food is later harder to clean off. This situation is accordingly in want of improvement.

Thus a principal object of the present invention is to provide a feeding dish for pets and animals, which overcomes the above objections by being readily disposable after a single use.

Another object is to provide a disposable pet and animal dish made of a thin, inexpensive material such as molded paper or plastic, or of formed aluminum foil so that in one particular design it can be interfitted together with other like dishes and fit into a small package for being retailed in a store, in a similar manner as paper picnic plates or Dixie cups are sold.

Yet another object is to provide a disposable pet and animal dish that will not tip over.

Yet another object is to provide a disposable pet and animal dish that is designed to include a peripheral catch-all gutter or trough so to prevent dripping or dropped foods from falling on a floor, thus eliminating the need to clean up the same.

Still a further object is to provide a disposable pet and animal dish that has a ridged bottom so to keep food from sliding inside the dish and out therefrom.

Other objects are to provide a disposable pet and animal dish which is simple in design, inexpensive to manufacture, rugged in construction, easy to use, and efficient in operation.

These and other objects will be readily evident upon a study of the following specification and the accompanying drawing wherein.

Figure 1:
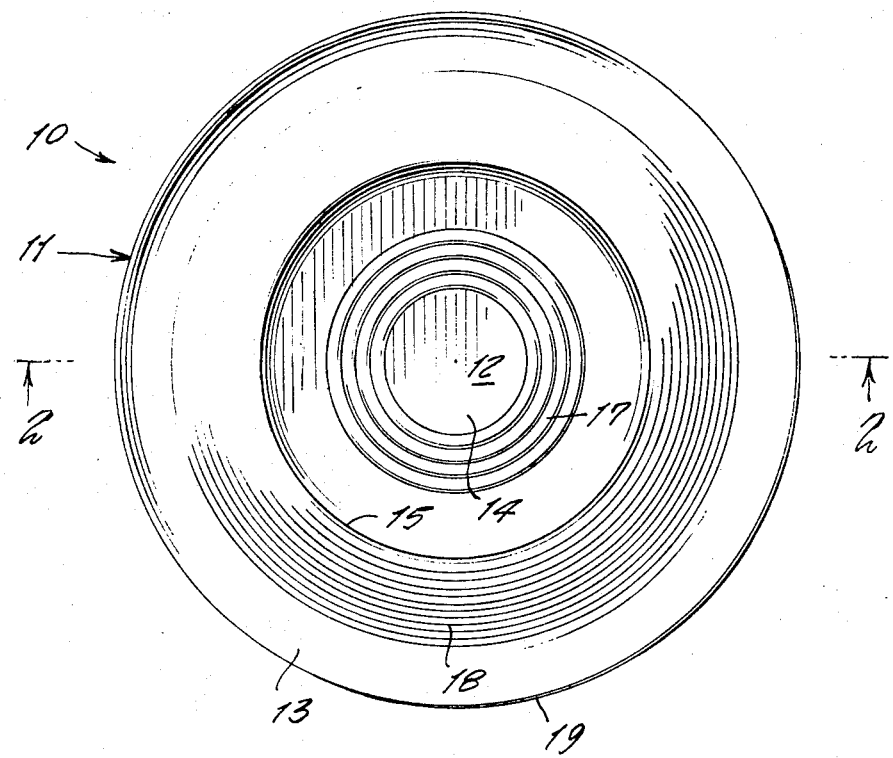
FIG. 1 is a top view of the invention.
Figure 2:
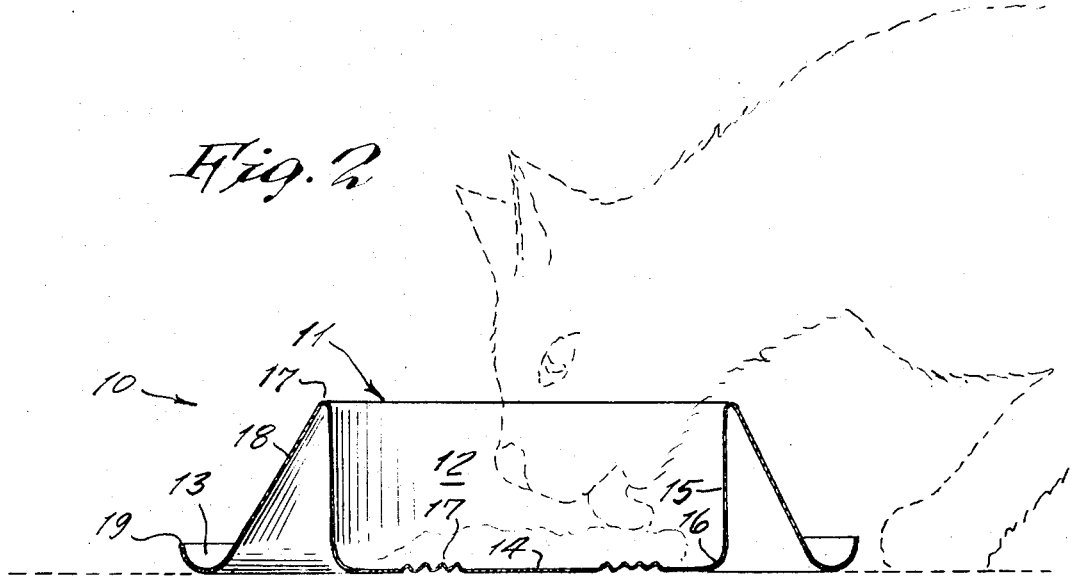
FIG. 2 is a cross-sectional view taken on line 2—2 of FIG. 1.

Referring now to the drawing in detail, the reference numeral 10 represents a disposable pet and animal dish according to the present invention wherein there is a one piece member 11 made of any inexpensive material such as pressed paper, molded plastic or formed aluminum foil so that it is disposable after a single use.

The member 11 includes a central bowl or depression 12 that is surrounded by a peripheral low trough 13.

The depression 12 includes a circular bottom wall 14 and vertical, cylindrical side wall 15; a gently rounded corner 16 being formed therebetween. Circular, concentric ridges and grooves 17 in the bottom wall 14 serve to frictionally prevent food pieces from sliding thereupon. The vertical side walls tend to prevent food from moving out of the bowl depression. A relatively sharp corner 17 along the upper edge of the depression has a conical wall 18 extending outwardly down therefrom, the lower edge of the conical wall ending in the trough 13 that serves to catch food that the animal has pushed out of the bowl depression or dropped from his mouth. The inclined conical wall 18 slows the speed of rolling down food so that it lodges in the trough and does not go over the outer edge 19. The conical wall also aids to prevent the pet to tip over the dish.

Thus there is provided a disposable pet and animal dish.

While various other changes may be made in the detail construction, it is understood that such changes will be within the spirit and scope of the present invention as is defined by the appended claims. One such change can consist of tapering the side wall 15 slightly downwardly inwardly so the device will readily nest with other like devices.

We claim:

1. In a disposable pet and animal dish the combination of a one-piece member designed to readily interfit with other like members for being compactly packaged in multiple number, and said member including means to prevent food being dropped or to drip upon a floor, said means comprising a central depression and a peripheral trough, said depression including a circular bottom wall and a side wall that tapers slightly upwardly outwardly, and a series of upwardly and downwardly extending circular concentric corrugations in said bottom wall, so to frictionally prevent food pieces to slide thereupon, said corrugations having lower convolutions, the underside of which are flush with the underside of said bottom wall, said corrugations accordingly extending upwardly higher than an upper side of said bottom wall, said trough being along a lower, outer edge of a conical wall that starts at the upper edge of said cylindrical wall.

* * * * *